United States Patent [19]
Rodgers

[11] Patent Number: 5,309,276
[45] Date of Patent: May 3, 1994

[54] CATOPTRIC OPTICAL SYSTEM INCLUDING CONCAVE AND CONVEX REFLECTORS

[75] Inventor: John M. Rodgers, Pasadena, Calif.

[73] Assignee: Optical Research Associates, Pasadena, Calif.

[21] Appl. No.: 755,515

[22] Filed: Aug. 29, 1991

[51] Int. Cl.$^5$ .............................................. G02B 17/06
[52] U.S. Cl. .................................... 359/366; 359/641
[58] Field of Search ............... 359/366, 365, 859, 858, 359/729, 731, 641

[56] References Cited

U.S. PATENT DOCUMENTS

| | | | |
|---|---|---|---|
| 4,205,902 | 6/1980 | Shafer | 359/366 |
| 4,226,501 | 10/1980 | Shafer | 359/859 |
| 4,691,999 | 9/1987 | Wheeler | 359/859 |
| 4,804,258 | 2/1989 | Kebo | 359/366 |
| 5,142,417 | 8/1992 | Brunn | 359/859 |
| 5,173,801 | 12/1992 | Cook | 359/366 |

OTHER PUBLICATIONS

David R. Shafer, "Laser Beam Expander . . . ", SPIE vol. 190 *LASL Optics Conf.*, pp. 15–20 (1979).

*Primary Examiner*—Jon W. Henry
*Attorney, Agent, or Firm*—Lyon & Lyon

[57] ABSTRACT

This is a catoptric optical system including afocal and focal embodiments comprising substantially aspheric concave first, convex second, third, and concave fourth reflection means producing an intermediate image between the first and fourth reflection means. In an afocal embodiment, the third reflection means is proximate the internal image produced by the second reflection means and provides aberration control and a compact beam folding function. In an alternate focal embodiment, the second reflection means is proximate the internal image produced by the first reflection means. Significant magnifying power is achieved for the afocal embodiment while minimizing aberration and distortion and providing full spectrum coverage with high image quality. The system provides a wide circular or square field of view with little or no obscuration in a compact envelope. The exiting beam is substantially normal to the incident beam and the exit pupil is external, even when the aperture stop is external to, or at, the primary mirror.

20 Claims, 4 Drawing Sheets

WAVELENGTH = 1000 NANOMETER (NM)

WAVE ABERRATIONS IN UNITS OF 0.01 WAVE
RMS WAVEFRONT ERROR = 0.046 WAVE
P-V WAVEFRONT ERROR = 0.251 WAVE

```
                                             9 10 11 12 12 11         14
                           4  6  8  8  9  9  8  8  8
                  0  2  4  5  6  6  6  6  6  5  5
            -5 -2  1  2  3  4  4  4  4  3  3  3
         -5 -6 -3 -1  1  2  2  2  2  2  1  1  1
      -6 -6 -4 -2  0  0  1  1  1  0  0 -1 -1 -1
   -7 -7 -4 -2 -1  0  0  0  0  0 -1 -1 -1 -1  0
-11-11-11 -7 -5 -3 -1 -1  0  0  0  0 -1 -1 -1 -1
   -7 -6 -4 -2 -1  0  0  0  0  0 -1 -1 -1  0
      -6 -4 -3 -2 -1  0  1  1  1  0  0  0
         -5 -3 -2  1  1  2  2  2  2  1  1  1
            -5 -2  1  2  3  4  4  4  4  3  3  3
                  0  2  4  5  6  6  6  6  6  5  5
                           4  6  8  8  9  9  8  8  8
                                             9 10 11 12 12 11         14
```

CATOPTRIC OPTICAL SYSTEM INCLUDING CONCAVE AND CONVEX REFLECTORS

FIELD OF THE INVENTION

The present invention relates generally to the field of optical systems and more particularly to an all-reflective, unobscured optical system.

BACKGROUND OF THE INVENTION

An all-reflective (or catoptric) optical system avoids chromatic aberration because there is no dispersion from a reflective surface as there is through a lens (which also produces transmission losses). A catoptric system thus allows a broad spectrum of electromagnetic radiation, from infrared to ultraviolet, to be focused identically within the limits of geometric optics.

Spherical aberration is produced by optical systems having different focal distances for different input ray heights, causing a rotationally symmetric blurred image of a point object. Comatic aberration, or coma, is produced when rays have different image heights depending on the distance of the ray from the center of the entrance pupil. The resulting image of a point object resembles a cone. Astigmatism is produced by optical systems having different focal distances in orthogonal directions, resulting in an image of a point ranging from a line to a circular blur, depending on the observation point.

An afocal optical system produces collimated exit beams from collimated entrance beams. A focal system produces focused exit beams from collimated entrance beams. The image of the aperture stop in object space is called the entrance pupil and is typically located at the primary mirror. The image of the aperture stop in image space is called the exit pupil.

Conventional afocal two-mirror and three-mirror systems, while providing aberration minimization, have the disadvantage of having a limited field of view when providing desirable diffraction-limited wavefront quality. Further, these conventional systems are typically overly long (having a length, or envelope, greater than three times the maximum pupil diameter) for many applications.

An example of a prior art two-mirror system is the Mersenne telescope which utilizes confocal paraboloidal mirrors producing an internal image. The field of view is quite narrow, typically 0.2×0.3° for diffraction-limited wavefront quality at 1000 nm wavelength. Further, Mersenne telescopes have a low exit pupil clearance (less than one exit pupil diameter from the nearest beam) making coupling to subsequent image-forming systems difficult. An example of a three-mirror system is U.S. Pat. No. 3,674,334 to Offner. This is a concave-convex-concave mirror system with the convex mirror providing field curvature correction allowing a greater field of view in one dimension (for example, greater than 4° total field) and greater exit pupil clearance. However, this three-mirror system has a limited field of view in the other dimension (for example, 0.1°×4.00° for diffraction-limited wavefront quality at 1000 nm wavelength). This results in an extreme rectangular field of view. Further, the envelope length is approximately 2.5 to 4 times the maximum pupil diameter, making the system too long for many space-limited applications.

An example of a four-mirror paraboloidal system for avoiding aberration is disclosed in U.S. Pat. No. 3,062,101 to McCarthy. Incident light is reflected by a concave mirror to a fold-flat mirror which redirects the beam 90° to a second concave mirror which is concentric with a third convex mirror and a fourth concave mirror, producing an image beyond the fourth mirror. Because of the concentric configuration, the fold-flat mirror causes obscuration which then necessarily limits the size of the fold-flat mirror and causes throughput limitations and diffraction effects on the image.

In summary, for many multiple mirror systems, there is the problem of possible obscuration caused by mirrors blocking rays and thereby decreasing both the amount of radiation gathered and the field of view while introducing adverse diffraction effects in the image. Further, multiple mirror systems, because of geometric requirements for achieving true images, may be overly large or bulky for many applications (such as airborne and outer space applications with their attendant packaging limitations). Still further, the entrance and exit pupils are typically not easily accessible, thereby causing other problems such as vignetting.

SUMMARY OF THE INVENTION

Accordingly, a principal object of the present invention is to provide an improved catoptric optical system. Further objects of this invention are to provide a compact, all-reflective optical system producing significant beam reduction while avoiding aberration and distortion and achieving a wide and symmetric field of view with high image quality. Still further objects of the invention are to provide a system having little or no obscuration, easily accessible exit and entrance pupils, and the capability of turning the line of sight on the order of 90 degrees.

These and other objects are realized by an optical system comprising substantially aspheric first, second, third, and fourth reflection means. In an afocal embodiment, the third reflection means is proximate the internal image produced by the first and second reflection means and provides aberration control and a compact beam folding function. In a focal embodiment, the second reflection means is proximate the internal image produced by the first reflection means.

A further understanding of the nature and advantages of the present invention may be realized by reference to the Detailed Description of the Invention and the attached drawings and tables.

DETAILED DESCRIPTION OF THE INVENTION

Figure 1:
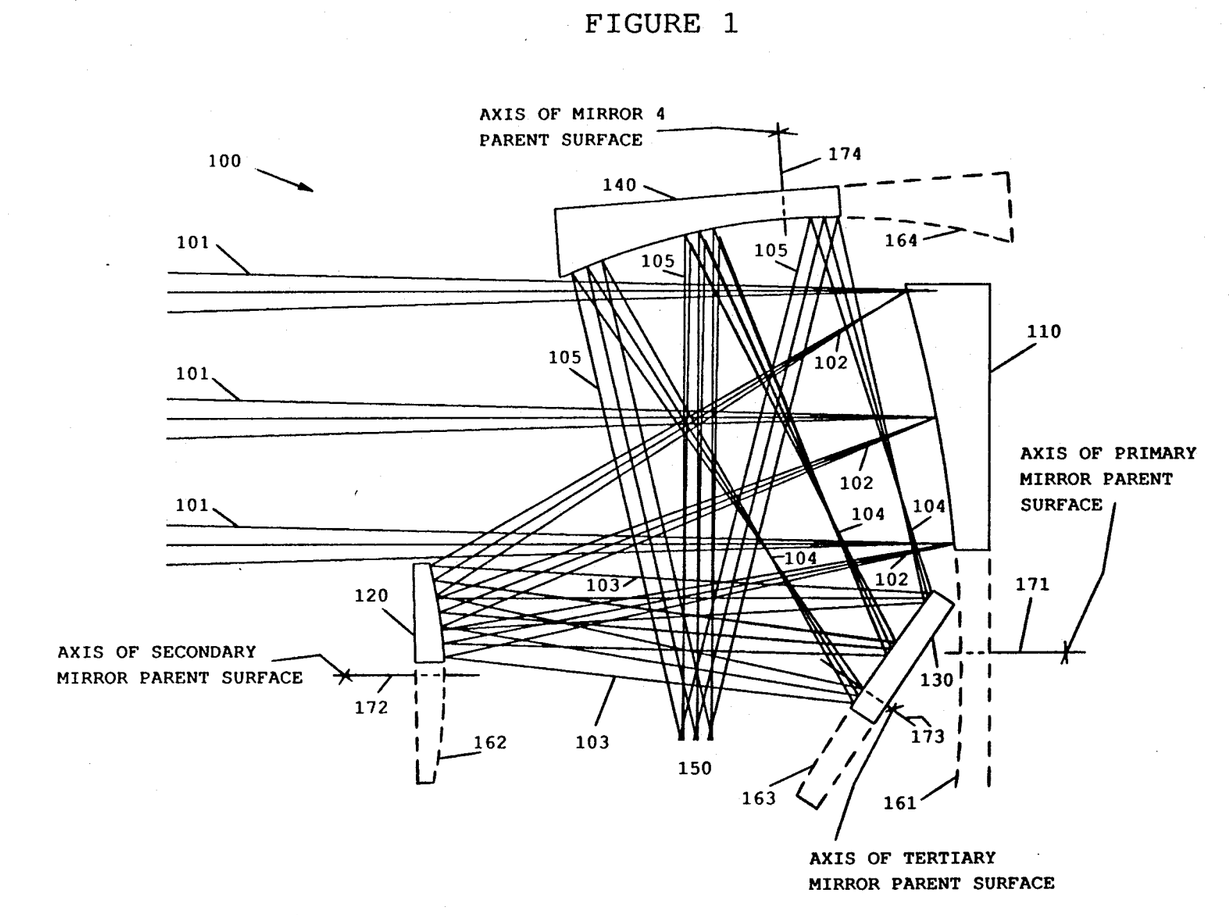
FIG. 1 is a schematic diagram of an afocal four-mirror aspheric optical system according to the present invention.

FIG. 1 is a schematic diagram of an optical system 100 according to a preferred embodiment of the invention. Incident beams 101 from an object (not shown)

enter system 100. Beams 10 are reflected by a primary aspheric concave mirror 110 which causes the beams 101 to converge to beams 102. Beams 102 are incident on a secondary aspheric convex mirror 120 which reflects the convergent beams 103. Beams 103 are incident on a tertiary aspheric mirror 130. In one embodiment of the invention, mirror 130 is convex and in another embodiment, mirror 130 is concave, but in both embodiments, mirror 130 is preferably aspheric to correct aberration, but not precisely flat. Mirror 130 is also preferably disposed proximate the internal image formed by mirror 120. This allows mirror 130 to control field aberrations such as coma and astigmatism, thereby providing a large two-dimensional field of view which is substantially symmetric as either a square or a circle. A beam 104 is reflected from mirror 130 to an aspheric concave fourth mirror 140 which substantially collimates beam 105 to an exit pupil 150 Exit pupil 150 has a significant axial clearance below the nearest beam (103). As an example, the axial clearance can be two exit pupil diameters, thereby making beam 103 accessible to the entrance pupil of any following optical systems. Mirror 130 is disposed at a large tilt angle (for example 30°) with the incident beam 101, thereby providing a beam folding configuration wherein reflected beams 104 and 105 pass in front of mirror 110 twice. This provides a beam folding function between entering and exiting beams that allows an extremely compact system configuration. In a preferred embodiment, system 100 is in a ball-like configuration advantageously suitable for gimballed and/or pod-mounted system packages. Further, the folding function provided by mirror 130 produces an exit beam 105 that is substantially normal to the incident beam 101. An entrance pupil may be disposed anywhere along beam 101 and is preferably disposed at mirror 110. Therefore, entrance and exit pupils are conveniently accessible. Exit pupil 150 is sufficiently clear of the last mirror 140 of system 100 to provide convenient coupling for image access instruments such as scan mirrors, beamsplitters, and focusing subsystems.

FIG. 1 further shows the axes of each of the mirrors 110, 120, 130, and 140. Short dashed lines 161, 162, 163, and 164 show the imagined curvature extensions of the surfaces of mirrors 110, 120, 130, and 140 respectively. Long dashed lines 171, 172, 173, and 174 denote the axes of mirrors 110, 120, 130, and 140 respectively. In the preferred embodiment, axis 173, is not coaxial. This non-coaxiality together with an optimized optical power distribution and placement of mirrors 110, 120, 130, and 140 provide image non-obscuration and achieve optimum image quality. However, primary mirror 110 and secondary mirror 120 in particular may be coaxial depending upon specific design requirements, and still be within the scope of the invention, and fourth mirror 140 can be coaxial with the reflected axes of mirrors 110 and 120 (reflected through mirror 130) in alternative embodiments of this invention.

Magnifying power is produced by the ratio of the radii of curvature of the mirrors and their relative locations. In a 9:1 magnifying power embodiment, the shapes of mirrors 110, 120, 130, and 140 are concave, convex, convex, and concave respectively. In the preferred embodiment, all mirrors 110, 120, 130, and 140 are aspheric. The relative powers in one compact 9:1 embodiment are 1:2.94:0.50:2.17. In an alternate embodiment having a 4:1 magnifying power, the shapes of mirrors 110, 120, 130, and 140 are concave, convex, concave, and concave respectively. The relative mirror powers in a compact 4:1 embodiment are 1:2.69:0.56:1.57. Various alternate embodiments in different mirror shape orders and different powers are within the contemplation of this invention. For example, an intermediate 6.5:1 image reduction embodiment utilizes a tertiary mirror 130 having almost no base curvature. The relative mirror powers for a compact 6.5:1 embodiment are 1:2.90:0.006:1.94.

The afocal, all-reflective (catoptric) system of this invention therefore provides significant magnifying power while minimizing aberration and providing full spectrum coverage at high wavefront quality. The nearly flat aspheric tertiary mirror 130 disposed proximate the internal image provides a large, even, symmetric (for example, a 1:1 aspect ratio) field of view which can be either square or circular. An example of this embodiment has a 100 mm diameter entrance pupil and a 3×3° object space field of view that is diffraction-limited at 1000 nm. The folding function provided by mirror 130 and the configuration of mirrors 110, 120, 130, and 140 provide a compact design. In the embodiment prescribed below, the maximum envelope diameter is less than 2.3 times the maximum pupil diameter. Exit pupil 150 in this embodiment is 17 exit pupil diameters away from mirror 140 and approximately two exit pupil diameters below beam 103, thereby providing excellent pupil clearance. In fact, in the preferred embodiment of the invention, exit pupil 150 is external even when the aperture stop is external to, or at, primary mirror 110.

Table I presents surface prescription data for a 9:1 image reduction embodiment. In Table I, a "decenter" (D(j)) defines a new coordinate system (displaced and/or rotated) whereby subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types which generate different new coordinate systems. Positive radii of curvature means that the center of curvature is to the right and negative radii of curvature means that the center of curvature is to the left. All dimensions are given in millimeters. Thickness means axial distance to the next surface. As explanation of Table I, A(i) indicates the aspheric mirror i defined by the equation $$Z = \frac{(CURV)Y^2}{1 + (1 - (1 + K)(CURV)^2 Y^2)^{\frac{1}{2}}} = (A)Y^4 + (B)Y^6 + (C)Y^8 + (D)Y^{10}$$

where the base curvature (CURV) and aspheric constants K, A, B, C, and D are given in Table II. Aperture diameter is denoted by C-1 ... C-4 and aperture data in terms of diameter, decenter system and rotation are given in Table III. Decenter system data are given in Table IV wherein tilt configurations are defined by angles alpha, beta, and gamma (degrees) following standard cartesian coordinate system nomenclature. The trailing code RETU means return to the coordinate system preceding the decentration and BEND means tilting the coordinate system following the reflection by an amount equal to the tilt of the surface in question. The reference wavelength is 1000.0 nm.

Figure 3:
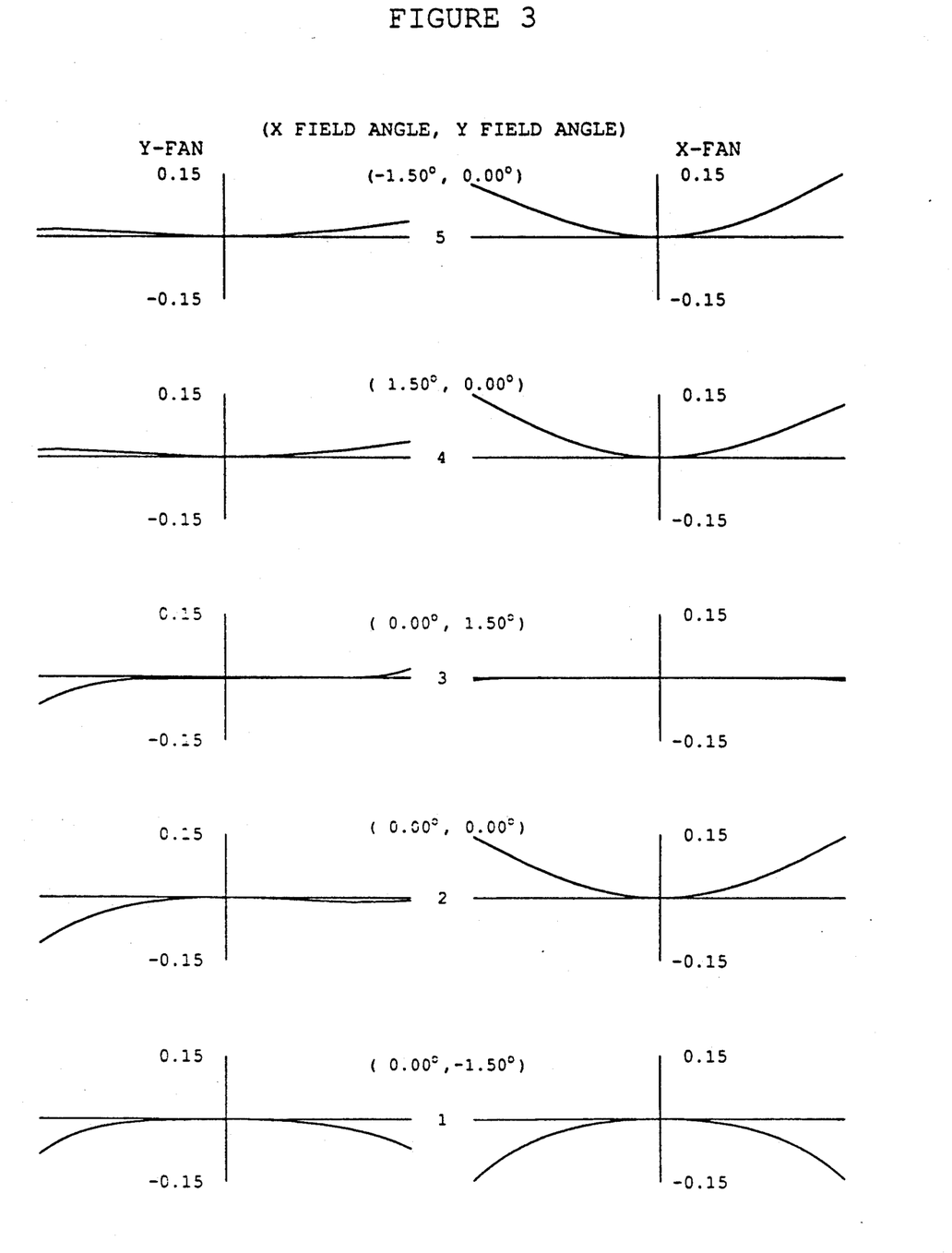
FIG. 3 shows wavefront aberration plots along the horizontal and vertical pupil meridians for a 9:1 four-mirror afocal system according to the present invention.
Figure 4:
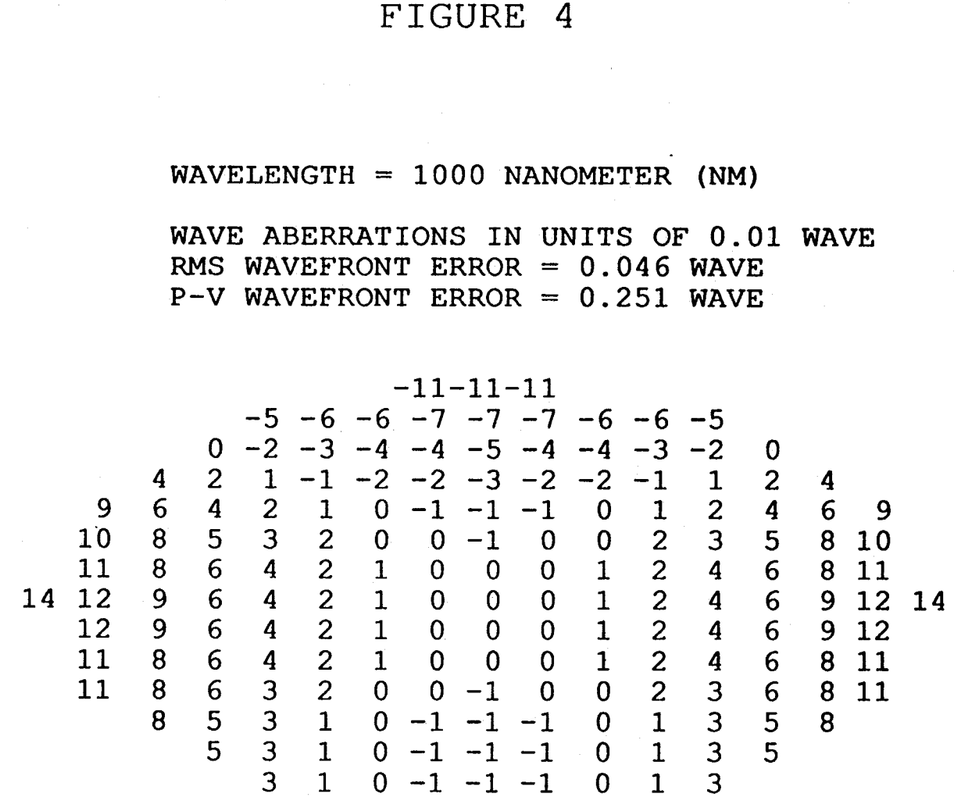
FIG. 4 shows a wavefront aberration map over the full pupil at a wavelength of 1000 nm for a 9:1 four-mirror afocal system according to the present invention.

An example of the image quality achieved by the 9:1 four-mirror afocal embodiment of the present invention is shown in FIGS. 3 and 4. FIG. 3 shows wavefront aberration plots along the horizontal and vertical pupil meridians and FIG. 4 shows a wavefront aberration map over the full pupil at a wavelength of 1000 nm. RMS wavefront error at 1000 nm is less than 0.055 across the 3×3° field for a 100 mm entrance pupil design.

Figure 2:
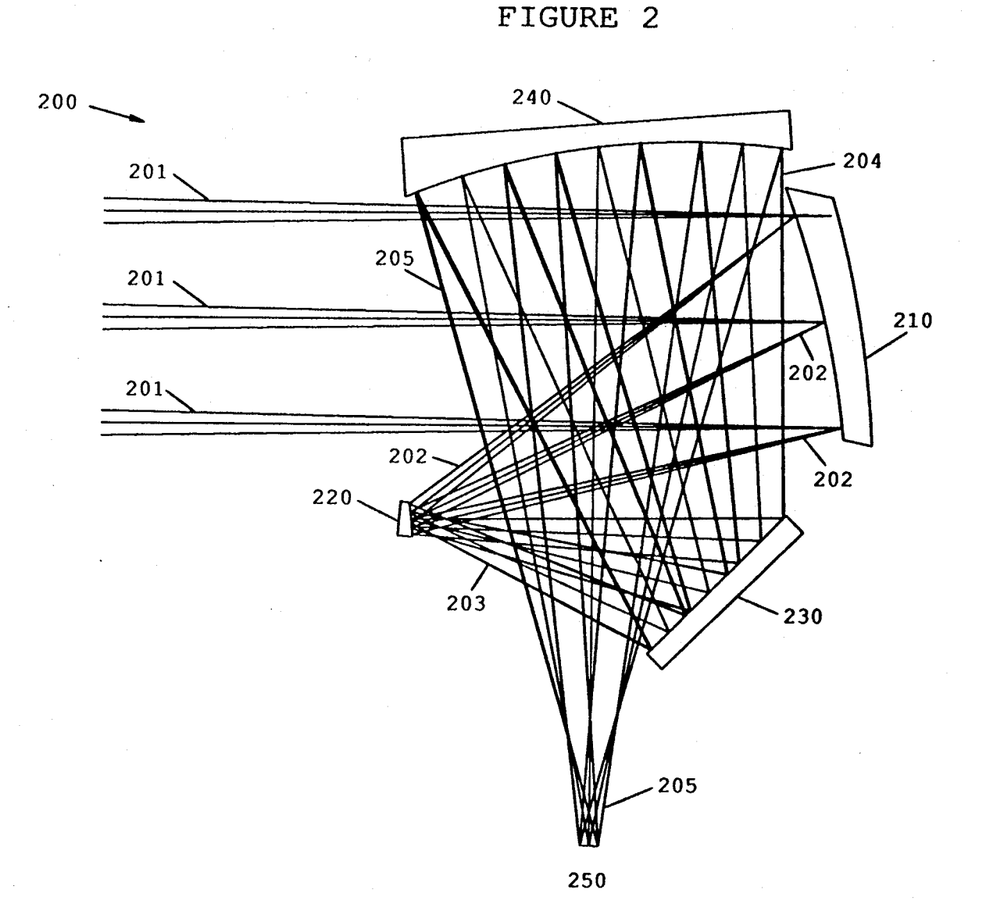
FIG. 2 is a schematic diagram of a focusing four-mirror aspheric optical system according to the present invention.

FIG. 2 shows a focusing four-mirror optical system 200 according to an alternate embodiment of the present invention. Incident beams 201 from an object (not shown) enter system 200. Beams 201 are reflected by a primary aspheric concave mirror 210 which causes the beams 201 to converge to beams 202. Beams 202 are incident on a secondary aspheric convex mirror 220 which reflects the divergent beams 203. Beams 203 are incident on a tertiary aspheric mirror 230. The placement of secondary mirror 220 is such that the intermediate image is near secondary mirror 220 (and not near the tertiary mirror as in the afocal system of FIG. 1). This produces focused exit beams 205 at 250 from collimated entrance beams 201. In one embodiment of the invention, mirror 230 is convex and in another embodiment, mirror 230 is concave, but in both embodiments, mirror 230 is preferably aspheric to correct aberration, but not precisely flat. A beam 204 is reflected from mirror 230 to an aspheric concave fourth mirror 240 which substantially focuses beam 205 to an exit pupil 250. Exit pupil 250 has a significant axial clearance below the nearest beam (203). For example, the axial clearance is almost two exit pupil diameters, thereby making beam 203 accessible to the entrance pupil of any following optical systems. Mirror 230 is disposed at a large tilt angle (for example 35°) with the incident beam 201, thereby providing a beam folding configuration wherein reflected beams 204 and 205 pass in front of mirror 210 twice. This provides a beam folding function between entering and exiting beams that allows an extremely compact system configuration. In a preferred embodiment, system 200 is in a ball-like configuration advantageously suitable for gimballed and/or pod-mounted system packages. Further, the folding function provided by mirror 230 produces an exit beam 205 that is substantially normal to the incident beam 201. An entrance pupil may be disposed anywhere along beam 201 and is preferably disposed at mirror 210. Therefore, entrance and exit pupils are conveniently accessible. Exit pupil 250 is sufficiently clear of the last mirror 240 of system 200 to provide convenient coupling for image access instruments such as scan mirrors or beamsplitters.

While the above description provides a full and complete description of preferred embodiments of the present invention, various modifications, alternate constructions, and equivalents may be employed while still remaining within the scope of the invention. As a first example, while some of the above descriptions refer primarily to afocal configurations, focal variations are within the scope of the invention. As a further example, embodiments other than the power ratio examples given and other applications not cited are within the scope of the invention. Therefore, the above description and illustrations should not be construed as limiting the scope of the invention which is defined by the following claims.

What is claimed is:

1. An afocal optical system comprising:
   concave first reflection means, having an axis, for reflecting an incident beam;
   convex second reflection means, disposed to receive the reflected beam from said first reflection means, for reflecting the beam reflected from said first reflection means;
   third reflection means, disposed to receive the beam reflected from said second reflection means and having a non-coaxial axis with said second reflection means axes, for reflecting the beam reflected from said second reflection means;
   concave fourth reflection means, disposed to receive the beam reflected from said third reflection means, for reflecting the beam reflected from said third reflection means; and
   said third reflection means is disposed at a tilt angle relative to said second and fourth reflection means and said fourth reflection means is folded so as to pass two times in front of said first reflection means and emerge as an exit beam being substantially normal to the incident beam.

2. The afocal optical system of claim 1 wherein said tilt angle is substantially 30°.

3. An afocal optical system comprising:
   concave first reflection means, having an axis, for reflecting an incident beam;
   convex second reflection means, disposed to receive the reflected beam from said first reflection means, for reflecting the beam reflected from said first reflection means;
   third reflection means, disposed to receive the beam reflected from said second reflection means and having a non-coaxial axis with said second reflection means axes, for reflecting the beam reflected from said second reflection means;
   concave fourth reflection means, disposed to receive the beam reflected from said third reflection means, for reflecting the beam reflected from said third reflection means; and
   said third reflection means is substantially convex.

4. An afocal optical system comprising:
   concave first reflection means, having an axis, for focusing an incident beam;
   convex second reflection means, disposed to receive the beam reflected from said first reflection means, for reflecting the beam reflected from said first reflection means, and wherein the first and second reflection means cause an internal image to be formed in the optical system;
   third reflection means, disposed to receive the beam reflected from said second reflection means and proximate the internal image formed by said first and second reflection means, for controlling the aberration and for folding of the beam reflected by said second reflection means;
   concave fourth reflection means, disposed to receive the beam reflected from said third reflection means, for concentrating the beam reflected by said third reflection means; and
   said third reflection is disposed at a tilt angle relative to the incident beam such that the beam reflected from said third and said fourth reflection means both pass in front of said first reflection means.

5. A method of forming an image from incident beams of radiation comprising the steps of:
   reflecting the incident beam so as to angularly converge and primarily redirect the beam at an angle from the incident beam direction;
   reflecting the primarily redirected beam utilizing a convex mirror to secondarily redirect the beam at an angle from both the incident beam and the primarily redirected beam directions;

reflecting the secondarily redirected beam utilizing a convex mirror to tertiarily redirect the beam at an angle from the incident beam, the primarily redirected beam, and the secondarily redirected beam, causing the tertiarily redirected beam to pass through said incident beam;

reflecting the tertiarily redirected beam utilizing a concave mirror to angularly converge and fourthly redirect the beam at an angle from the incident beam, the primarily redirected beam, the secondarily redirected beam, and the tertiarily redirected beam, causing the fourthly redirected beam to pass through said incident beam and exit at an angle to the incident beam.

6. The method of claim 5 wherein said reflection of the secondarily redirected beam utilizes an aspheric reflection surface.

7. The method of claim 5 wherein said exit angle is substantially 90°.

8. The method of claim 5 comprising forming an intermediate image between said reflecting the incident beam and said reflecting the tertiarily redirected beam steps.

9. An afocal optical system comprising:
concave first reflection means, having an axis, for focusing an incident beam;
convex second reflection means, disposed to receive the beam reflected from said first reflection means, for reflecting the beam reflected from said first reflection means;
third reflection means, disposed to receive the beam reflected from said second reflection means and proximate the internal image formed by said first and second reflection means, for controlling the aberration and for folding of the beam reflected by said second reflection means;
concave fourth reflection means, disposed to receive the beam reflected from said third reflection means, for concentrating the beam reflected by said third reflection means; and
said first, second, third, and fourth reflection means are disposed such that the exiting beam reflected from said fourth reflection means is substantially normal to the incident beam.

10. An afocal optical system comprising:
concave first reflection means, having an axis, for focusing an incident beam;
convex second reflection means, disposed to receive the beam reflected from said first reflection means, for reflecting the beam reflected from said first reflection means;
third reflection means, disposed to receive the beam reflected from said second reflection means and proximate the internal image formed by said first and second reflection means, for controlling the aberration and for folding of the beam reflected by said second reflection means;
concave fourth reflection means, disposed to receive the beam reflected from said third reflection means, for concentrating the beam reflected by said third reflection means; and
said third reflection means is substantially convex.

11. An afocal optical system comprising:
concave first reflection means, having an axis, for reflecting an incident beam;
convex second reflection means, disposed to receive the reflected beam from said first reflection means, for reflecting the beam reflected from said first reflection means;
third reflection means, disposed to receive the beam reflected from said second reflection means and having a non-coaxial axis with said second reflection means axes, for reflecting the beam reflected from said second reflection means;
concave fourth reflection means, disposed to receive the beam reflected from said third reflection means, for reflecting the beam reflected from said third reflection means; and
said third reflection means is substantially convex.

12. The focal optical system of claim 11 wherein said third reflection means is substantially concave.

13. The focal optical system of claim 11 wherein said third reflection means is substantially flat.

14. The focal optical system of claim 11 having an exit pupil and being at least one exit pupil diameter removed from the nearest beam, thereby being substantially accessible.

15. An afocal optical system comprising:
concave first reflection means, having an axis, for reflecting an incident beam;
convex second reflection means, disposed to receive the reflected beam from said first reflection means, for reflecting the beam reflected from said first reflection means;
third reflection means, disposed to receive the beam reflected from said second reflection means and having a non-coaxial axis with said second reflection means axes, for reflecting the beam reflected from said second reflection means;
concave fourth reflection means, disposed to receive the beam reflected from said third reflection means, for reflecting the beam reflected from said third reflection means;
the beam reflected by said third reflection means passes in front of said first reflection means and the beam reflected by said fourth reflection means also passes in front of said first reflection means; and
said system forms an intermediate image between said first and said fourth reflection means.

16. An afocal optical system comprising:
concave first reflection means, having an axis, for reflecting an incident beam;
convex second reflection means, disposed to receive the reflected beam from said first reflection means, for reflecting the beam reflected from said first reflection means;
third reflection means, disposed to receive the beam reflected from said second reflection means and having a non-coaxial axis with said second reflection means axes, for reflecting the beam reflected from said second reflection means;
concave fourth reflection means, disposed to receive the beam reflected from said third reflection means, for reflecting the beam reflected from said third reflection means; and
said third reflection means is disposed at a tilt angle of substantially 35° relative to said second and fourth reflection means such that the beam reflected from said third reflection means and said fourth reflection means is folded so as to pass two times in front of said first reflection means and emerge as an exit beam being substantially normal to the incident beam.

17. An afocal optical system comprising:

concave first reflection means for reflecting an incident beam;

convex second reflection means, disposed to receive the reflected beam from said first reflection means for reflecting the beam reflected from said first reflection means;

third reflection means, disposed to receive the beam reflected from said second reflection means and proximate the internal image formed by said second reflection means, for reflecting the beam reflected from said second reflection means;

concave fourth reflection means, disposed to receive the beam reflected from said third reflection means, for reflecting the beam reflected from said third reflection means; and said third reflection means is disposed at a tilt angle of substantially 30° relative to said second and fourth reflection means such that the beam reflected from said third reflection means and said fourth reflection means is folded so as to pass two times in front of said first reflection means and emerge as an exit beam being substantially normal to the incident beam, thereby allowing compact sizing and an external exit pupil.

18. An afocal optical system comprising:

concave first reflection means for reflecting an incident beam;

convex second reflection means, disposed to receive the reflected beam from said first reflection means for reflecting the beam reflected from said first reflection means;

substantially convex third reflection means, disposed to receive the beam reflected from said second reflection means and proximate the internal image formed by said second reflection means, for reflecting the beam reflected from said second reflection means;

concave fourth reflection means, disposed to receive the beam reflected from said third reflection means, for reflecting the beam reflected from said third reflection means; and said third reflection means is disposed at a tilt angle relative to said second and fourth reflection means such that the beam reflected from said third reflection means and said fourth reflection means is folded so as to pass two times in front of said first reflection means and emerge as an exit beam being substantially normal to the incident beam, thereby allowing compact sizing and an external exit pupil.

19. A method of forming an image from incident beams of radiation comprising the steps of:

reflecting the incident beam so as to angularly converge and primarily redirect the beam at an angle from the incident beam direction;

reflecting the primarily redirected beam utilizing a convex mirror to secondarily redirect the beam at an angle from both the incident beam and the primarily redirected beam directions;

reflecting the secondarily redirected beam utilizing a concave mirror to tertiarily redirect the beam at an angle from the incident beam, the primarily redirected beam, and the secondarily redirected beam, causing the tertiarily redirected beam to pass through said incident beam; and reflecting the tertiarily redirected beam so as to angularly converge and fourthly redirect the beam at an angle from the incident beam, the primarily redirected beam, the secondarily redirected beam, and the tertiarily redirected beam, causing the fourthly redirected beam to pass through said incident beam and exit at an angle of substantially 90° to the incident beam.

20. A method of forming an image from incident beams of radiation comprising the steps of:

reflecting the incident beam so as to angularly converge and primarily redirect the beam at an angle from the incident beam direction;

reflecting the primarily redirected beam utilizing a convex mirror to secondarily redirect the beam at an angle from both the incident beam and the primarily redirected beam directions;

reflecting the secondarily redirected beam utilizing a concave mirror to tertiarily redirect the beam at an angle from the incident beam, the primarily redirected beam, and the secondarily redirected beam, causing the tertiarily redirected beam to pass through said incident beam;

reflecting the tertiarily redirected beam so as to angularly converge and fourthly redirect the beam at an angle from the incident beam, the primarily redirected beam, the secondarily redirected beam, and the tertiarily redirected beam, causing the fourthly redirected beam to pass through said incident beam and exist at an angle to the incident beam; and forming an intermediate image between said reflecting the incident beam and said reflecting the tertiarily redirected beam steps.

* * * * *

UNITED STATES PATENT AND TRADEMARK OFFICE
CERTIFICATE OF CORRECTION

PATENT NO. : 5,309,276

DATED : May 3, 1994

INVENTOR(S) : John M. Rodgers

It is certified that error appears in the above-indentified patent and that said Letters Patent is hereby corrected as shown below:

In the drawings, following sheet 4, Figure 4, insert the following:

| ELEMENT NUMBER | RADIUS OF CURVATURE FRONT | BACK | THICKNESS | APERTURE DIAMETER FRONT | BACK | GLASS |
|---|---|---|---|---|---|---|
| OBJECT | INF | | INFINITY | | | AIR |
| | | DECENTER( 1) | 300.0000 | | | |
| | | | APERTURE STOP 9.7068 | 100.0000 | | |
| 1 | A(1) | | -201.6051 | | C-1 | REFL |
| | | DECENTER( 2) | | | | |
| 2 | A(2) | | 163.1979 | | C-2 | REFL |
| | | DECENTER( 3) | | | | |
| 3 | A(3) | | -184.1322 | | C-3 | REFL |
| | | DECENTER( 4) | | | | |
| 4 | A(4) | | 177.8430 | | C-4 | REFL |
| | | DECENTER( 5) | | | | |
| IMAGE | IMAGE DISTANCE = INF | DECENTER( 6) | 200.0000 | | | |

TABLE I

| ASPHERIC | CURV | ASPHERIC CONSTANTS K | A | B | C | D |
|---|---|---|---|---|---|---|
| A( 1) | -0.00188146 | -1.025930 | 0.00000E+00 | 3.84023E-16 | -9.85471E-21 | 1.11997E-25 |
| A( 2) | -0.00556656 | 0.000000 | 7.62432E-08 | -6.11470E-13 | -3.94500E-16 | 8.47846E-20 |
| A( 3) | 0.00094079 | 0.000000 | 5.31388E-08 | 3.51042E-13 | 0.00000E+00 | 0.00000E+00 |
| A( 4) | 0.00410478 | -0.707502 | 0.00000E+00 | 7.14689E-14 | 5.37525E-18 | -4.81861E-22 |

TABLE II

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

APERTURE DATA

| APERTURE | SHAPE | DIAMETER X | DIAMETER Y | DECENTER X | DECENTER Y | ROTATION |
|---|---|---|---|---|---|---|
| C- 1 | CIRCLE | 100.889 | 100.889 | 0.000 | 101.600 | 0.0 |
| C- 2 | CIRCLE | 36.444 | 36.444 | 0.000 | 23.300 | 0.0 |
| C- 3 | CIRCLE | 53.333 | 53.333 | 0.000 | 19.800 | 0.0 |
| C- 4 | CIRCLE | 106.667 | 106.667 | 0.000 | -32.980 | 0.0 |

TABLE III

| DECENTER | X | Y | Z | ALPHA | BETA | GAMMA | |
|---|---|---|---|---|---|---|---|
| D( 1) | 0.0000 | 101.5931 | 0.0000 | 0.0000 | 0.0000 | 0.0000 | (RETU) |
| D( 2) | 0.0000 | 1.4085 | 0.0000 | 1.2168 | 0.0000 | 0.0000 | (RETU) |
| D( 3) | 0.0000 | -6.1710 | 0.0000 | -33.8670 | 0.0000 | 0.0000 | (BEND) |
| D( 4) | 0.0000 | 41.1701 | 0.0000 | -17.6758 | 0.0000 | 0.0000 | (RETU) |
| D( 5) | 0.0000 | -66.9660 | 0.0000 | -22.2660 | 0.0000 | 0.0000 | (RETU) |
| D( 6) | 0.0000 | 0.0000 | 0.0000 | 12.9635 | 0.0000 | 0.0000 | (RETU) |

TABLE IV

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

FABRICATION DATA

OPTICAL RESEARCH ASSOCIATES

19-AUG-91
9:1 4-MIRROR FOLDED AFOCAL

| ELEMENT NUMBER | RADIUS OF CURVATURE FRONT | BACK | THICKNESS | APERTURE DIAMETER FRONT | BACK | GLASS |
|---|---|---|---|---|---|---|
| OBJECT | INF | | INFINITY | | 319.0077 | AIR |
| | | DECENTER( 1) | 300.0000 | | | |
| | | | APERTURE STOP 9.7068 | | 100.0000 | |
| 1 | A(1) | | -201.6051 | | C-1 | REFL |
| | | DECENTER( 2) | | | | |
| 2 | A(2) | | 163.1979 | | C-2 | REFL |
| | | DECENTER( 3) | | | | |
| 3 | A(3) | | -184.1322 | | C-3 | REFL |
| | | DECENTER( 4) | | | | |
| 4 | A(4) | | 177.8430 | | C-4 | REFL |
| | | DECENTER( 5) | | | 14.4998 | |
| IMAGE | IMAGE DISTANCE = INF DECENTER( 6) | | 200.0000 | | 106.1589 | |

NOTES - Positive radius indicates the center of curvature is to the right
       Negative radius indicates the center of curvature is to the left
     - Dimensions are given in millimeters

- Thickness is axial distance to next surface

- Image diameter shown above is a paraxial value,
       it is not a ray traced value

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

APERTURE DATA

| APERTURE | SHAPE | DIAMETER X | DIAMETER Y | DECENTER X | DECENTER Y | ROTATION |
|----------|--------|---------|---------|-------|---------|----------|
| C-1 | CIRCLE | 100.889 | 100.889 | 0.000 | 101.600 | 0.0 |
| C-2 | CIRCLE | 36.444  | 36.444  | 0.000 | 23.300  | 0.0 |
| C-3 | CIRCLE | 53.333  | 53.333  | 0.000 | 19.800  | 0.0 |
| C-4 | CIRCLE | 106.667 | 106.667 | 0.000 | -32.980 | 0.0 |

ASPHERIC CONSTANTS $$Z = \frac{(CURV) Y^2}{1 + (1-(1+K)(CURV)^2 Y^2)^{1/2}} + (A)Y^4 + (B)Y^6 + (C)Y^8 + (D)Y^{10}$$

| ASPHERIC | CURV | K | A | B | C | D |
|----------|------|---|---|---|---|---|
| A(1) | -0.00188146 | -1.025930 | 0.00000E+00 | 3.84023E-16 | -9.85471E-21 | 1.11997E-25 |
| A(2) | -0.00556656 |  0.000000 | 7.62432E-08 | -6.11470E-13 | -3.94500E-16 | 8.47846E-20 |
| A(3) |  0.00094079 |  0.000000 | 5.31388E-08 | 3.51042E-13 | 0.00000E+00 | 0.00000E+00 |
| A(4) |  0.00410478 | -0.707502 | 0.00000E+00 | 7.14689E-14 | 5.37525E-18 | -4.81861E-22 |

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

DECENTERING CONSTANTS

| DECENTER | X | Y | Z | ALPHA | BETA | GAMMA | |
|---|---|---|---|---|---|---|---|
| D( 1) | 0.0000 | 101.5931 | 0.0000 | 0.0000 | 0.0000 | 0.0000 | (RETU) |
| D( 2) | 0.0000 | 1.4085 | 0.0000 | 1.2168 | 0.0000 | 0.0000 | (RETU) |
| D( 3) | 0.0000 | -6.1710 | 0.0000 | -33.8670 | 0.0000 | 0.0000 | (BEND) |
| D( 4) | 0.0000 | 41.1701 | 0.0000 | -17.6758 | 0.0000 | 0.0000 | (RETU) |
| D( 5) | 0.0000 | -66.9660 | 0.0000 | -22.2660 | 0.0000 | 0.0000 | |
| D( 6) | 0.0000 | 0.0000 | 0.0000 | 12.9635 | 0.0000 | 0.0000 | (RETU) |

A decenter defines a new coordinate system (displaced and/or rotated) in which subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types and these generate different new coordinate systems; those used here are explained below. Alpha, beta, and gamma are in degrees.

DECENTERING CONSTANT KEY:

| TYPE | TRAILING CODE | ORDER OF APPLICATION |
|---|---|---|
| DECENTER | | DISPLACE (X,Y,Z)<br>TILT (ALPHA,BETA,GAMMA)<br>REFRACT AT SURFACE<br>THICKNESS TO NEXT SURFACE |
| DECENTER & RETURN | RETU | DECENTER (X,Y,Z,ALPHA,BETA,GAMMA) show ()<br>REFRACT AT SURFACE<br>RETURN (-GAMMA,-BETA,-ALPHA,-Z,-Y,-X)<br>THICKNESS TO NEXT SURFACE |
| DECENTER & BEND | BEND | DECENTER (X,Y,Z,ALPHA,BETA,GAMMA) show ()<br>REFLECT AT SURFACE<br>BEND (ALPHA,BETA,GAMMA)<br>THICKNESS TO NEXT SURFACE |

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

---

REFERENCE WAVELENGTH = 1000.0 NM

---

```
    This is a decentered system.  If elements with power are
    decentered or tilted, the first order properties are probably
    inadequate in describing the system characteristics.

INFINITE CONJUGATES
    EFL         =  -1847.7694
    BFL         =    219.7598
    FFL         = -16016.9477
    F/NO        =    -18.4777
    IMAGE DIST  =    200.0000
    OAL         =    265.0103
    PARAXIAL
      IMAGE HT  =      0.0000
    SEMI-FIELD
      ANGLE     =      0.0000
    ENTR PUPIL
      DIAMETER  =    100.0000
      DISTANCE  =    300.0000
    EXIT PUPIL
      DIAMETER  =     11.3242
      DISTANCE  =     10.5141
    APER STOP
      DIAMETER  =    100.0000
```

---

UNITED STATES PATENT AND TRADEMARK OFFICE
CERTIFICATE OF CORRECTION

PATENT NO. : 5,309,276
DATED : May 3, 1994
INVENTOR(S) : John M. Rodgers

It is certified that error appears in the above-indentified patent and that said Letters Patent is hereby corrected as shown below:

```
NOTES - FFL is measured from the first surface
      - BFL is measured from the last surface
```

Signed and Sealed this

Second Day of September, 1997

Attest:

BRUCE LEHMAN

Attesting Officer     Commissioner of Patents and Trademarks